(12) United States Patent
Hatanaka et al.

(10) Patent No.: US 8,954,212 B2
(45) Date of Patent: Feb. 10, 2015

(54) CONTROL DEVICE FOR ELECTRIC VEHICLE

(75) Inventors: Kaoru Hatanaka, Wako (JP); Sumitaka Ogawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 201 days.

(21) Appl. No.: 13/362,684

(22) Filed: Jan. 31, 2012

(65) Prior Publication Data
US 2012/0203407 A1 Aug. 9, 2012

(30) Foreign Application Priority Data

Feb. 3, 2011 (JP) .................................. 2011-021467

(51) Int. Cl.
*B60L 11/00* (2006.01)
*B60W 10/08* (2006.01)
*B60K 28/00* (2006.01)
*B60L 15/20* (2006.01)

(52) U.S. Cl.
CPC ......... *B60L 15/2063* (2013.01); *B60L 2240/12* (2013.01); *B60L 2250/24* (2013.01); *B60L 2200/12* (2013.01)
USPC ............................. 701/22; 74/491; 180/65.31

(58) Field of Classification Search
None
See application file for complete search history.

(56) References Cited

U.S. PATENT DOCUMENTS

| | | | | |
|---|---|---|---|---|
| 5,730,243 A | * | 3/1998 | Koike et al. | 180/220 |
| 6,724,165 B2 | * | 4/2004 | Hughes | 318/376 |
| 7,549,900 B2 | * | 6/2009 | Kinoshita et al. | 440/1 |
| 2005/0042947 A1 | * | 2/2005 | Saito | 440/84 |
| 2009/0069964 A1 | * | 3/2009 | Wyatt et al. | 701/22 |
| 2010/0210155 A1 | * | 8/2010 | Kinoshita | 440/1 |
| 2011/0301824 A1 | * | 12/2011 | Nelson et al. | 701/102 |
| 2012/0080249 A1 | * | 4/2012 | Yates et al. | 180/65.31 |
| 2012/0111137 A1 | * | 5/2012 | Bliss et al. | 74/504 |

FOREIGN PATENT DOCUMENTS

JP  2010-120597 A  6/2010

\* cited by examiner

*Primary Examiner* — James Trammell
*Assistant Examiner* — Demetra Smith-Stewart
(74) *Attorney, Agent, or Firm* — Birch, Stewart, Kolasch & Birch, LLP

(57) ABSTRACT

A control device for a creep speed advance and creep speed backing up of an electric vehicle. A mode switch provided with an operating section can be operated in a longitudinal direction and can be operated leftward from an intermediate part. The operating section is automatically returned to a stop position in which a speed zero instruction is output to a motor when not being operated by return springs. When the operating section is pushed forward, a creep speed advance mode can be selected and when the operating section is pulled backward, a creep speed backing up mode can be selected. To clearly discriminate a position of the operating section among the creep speed advance mode, the creep speed backing up mode and a normal mode, a stopper is arranged between the stop position and the normal mode so that larger force is required to operate the operating section.

18 Claims, 8 Drawing Sheets

STOP MODE

CREEP SPEED ADVANCE MODE

CREEP SPEED BACKING MODE

NORMAL MODE

CONTROL DEVICE FOR ELECTRIC VEHICLE

CROSS-REFERENCE TO RELAYED APPLICATIONS

The present application claims priority under 35 USC 119 to Japanese Patent Application No. 2011-021467 filed Feb. 3, 2011 the entire contents of which are hereby incorporated by reference.

BACKGROUND OF THE INVENTION

1. Field of the Invention

The present invention relates to a control device for an electric vehicle, particularly relates to a control system for the electric vehicle that enables an advance and backing up of the vehicle.

2. Description of Background Art

JP-A No. 2010-120597 discloses a vehicle that can be advanced and backed up. In the conventional type vehicle, a single backing up switch is provided having a function as a mode setting/operating switch for setting a backing up mode and a function for rotating a motor as a driving source of the vehicle in a reverse direction (that is, in a direction in which the vehicle is backed up). When the backing up mode is set by pushing the backing up switch long, the vehicle can be backed up by operating the backing up switch and the vehicle can be advanced by operating an accelerator grip. In addition, in JP-A No. 2010-120597, a configuration is disclosed in which a switch for setting the backing up mode is dedicatedly provided separately from the backing up switch.

As in the vehicle disclosed in JP-A No. 2010-120597, even after the mode is turned to the backing up mode, the operation for an advance is also performed with the accelerator grip when the vehicle is advanced in the backing up mode and operation for backing up is performed with the backing up switch when the vehicle is backed up. Different operating members are operated respectively in the advance and backing up modes. Accordingly, the vehicle disclosed in JP A No. 2010-120597 still has many switches that require an operation in a backing up mode though the vehicle has it for an object to remove the intricacy of the operation when the advance and backing up of the vehicle are required to be repeatedly switched as in parking and has room for more improving the intricacy of the operation.

SUMMARY AND OBJECTS OF THE INVENTION

An object of an embodiment of the present invention is to provide a control system for an electric vehicle that enables reducing the switching operation for backing up and improves the intricacy of operation.

To achieve the object, the present invention is based upon a control device for an electric vehicle such as a saddle-ride type electric vehicle provided with a motor for operating the vehicle according to a speed instruction according to a throttle opening by an accelerator operating means. A first mode switch is provided separately from the accelerator operating means for selecting either of a normal mode of the vehicle or a backing up mode. Mode discriminating means are provided for discriminating that the backing up mode is selected by the mode switch at least on the premise that the throttle opening is zero and vehicle speed is zero and a driving section that supplies a creep speed backing up instruction determined in a creep speed range in which a vehicle speed lower than maximum vehicle speed in the normal mode is set as a maximum speed when the backing up mode is selected by the mode discriminating means to the motor.

According to an embodiment of the present invention, the mode switch is configured so that a stop can be selected corresponding to a position operated by a single operating section in addition to the normal mode and the backing up mode of the vehicle.

According to an embodiment of the present invention, the mode switch is provided with a return spring which is configured so that the return spring can be displaced among each switched position of the normal mode, the backing up mode and the stop and which automatically returns the mode switch (49) to a stop position set in an intermediate part of switched positions of the normal mode and the backing up mode in a free state in which no operating external force is applied.

Furthermore, according to an embodiment of the present invention, stopper means is provided that is made to recede to a stopper release position when the mode switch is energized by the operation of the operating section and arranged between the normal mode and the stop position so that the operating section can be alternately displaced between the normal mode and the stop position.

Furthermore, according to an embodiment of the present invention, the mode switch is composed of a first switch that switches validity and invalidity of the normal mode and a second switch which is turned valid when the first switch is turned invalid and in which either of the stop or the backing up mode can be selected.

According to an embodiment of the present invention, the first switch is a push switch provided with an initial position and a pushed position and configured so that the push switch is returned to the initial position when pushing operation is performed again in the pushed position and the second switch is provided with the return spring which is configured so that the return spring can be displaced between the backing up mode and the stop position and which automatically returns the second switch to the stop position in the free state in which no operating external force is applied.

According to an embodiment of the present invention, the creep speed backing up instruction corresponds to a fixed vehicle speed preset in the creep speed range.

According to an embodiment of the present invention, the creep speed backing up instruction corresponds to vehicle speed determined according to the throttle opening in the creep speed range.

According to an embodiment of the present invention, the throttle opening is provided with a creep region and a creep control section that supplies a creep speed instruction including a smaller value than a value in the creep speed range in the creep region to the driving section is provided.

According to an embodiment of the present invention, an inclination sensor that detects an angle at which the electric vehicle is inclined sideways from a state in which the electric vehicle is vertically stood is provided and the mode discriminating means discriminates the mode when it is determined based upon the inclination that it is not detected that the electric vehicle is not upset.

According to an embodiment of the present invention, a seat switch that outputs a detection signal when a rider is seated on a seat is provided and the mode discriminating means discriminates the mode when the rider is seated on the seat.

According to an embodiment of the present invention, a creep speed operating control section (85) supplies a creep speed backing up instruction to run the electric vehicle at a creep vehicle speed lower than a speed at which the rider can walk, pushing the electric vehicle to the driving section when vehicle speed is lower than the preset above-mentioned speed in the backing up mode.

According to an embodiment of the present invention, the creep speed operating control section supplies the speed instruction to stop the electric vehicle to the driving section when vehicle speed is higher than the preset speed at which the rider walks, pushing the electric vehicle in the backing up mode.

According to an embodiment of the present invention, the backing up mode further includes a creep speed advance mode for advancing the vehicle in the creep speed range and the mode switch is configured so that an advance and the backing up of the vehicle included in the backing up mode can be selected.

According to an embodiment of the present invention, the stop position is set between a position in which an advance is selected and a position in which backing up is selected in the backing up mode of the mode switch.

According to an embodiment of the present invention, after the backing up mode is selected by the mode switch, the electric vehicle can be easily run (including an advance and backing up) in a range of a lower speed than normal speed by one operating member. Particularly, as the electric vehicle can be advanced and backed up using the normal accelerator operating means, the operation is extremely simple, in addition, the mode is not required to be switched except when the vehicle is stopped, and the mode can be switched only when the switching is required.

According to an embodiment of the present invention, the mode can be easily switched from the normal mode to the backing up mode by the mode switch composed of the single operating section.

According to an embodiment of the present invention, as the mode switch is automatically returned to the stop position which is the mode in which the motor is not driven unless the rider operates when no external force, that is, no operating physical force is applied, the rider can perform the operation without anxiety.

According to an embodiment of the present invention, as no switching is made between the normal mode and the stop unless the stopper is made to recede, the unintended switching from the stop and the backing up mode to the normal mode is avoided and the unintended reverse switching can be also prevented.

According to an embodiment of the present invention, as the operating section of the mode switch is divided in a plurality (two), a distinction between the normal mode and the backing up mode is clear.

According to an embodiment of the present invention, the electric vehicle can be backed up at preset fixed creep vehicle speed.

According to an embodiment of the present invention, the electric vehicle can be backed up at speed in the creep speed range according to the throttle opening.

According to an embodiment of the present invention, as the creep region in which the electric vehicle is run at further lower speed than speed in the creep speed range is provided, the electric vehicle is never suddenly operated in the switched mode only by switching the mode switch.

According to an embodiment of the present invention, even if the rider touches the mode switch in the vicinity of the grip to raise the upset electric vehicle when the electric vehicle is upset, unnecessary creep speed control can be avoided.

According to an embodiment of the present invention, the electric vehicle can be backed up at the predetermined creep vehicle speed when the rider is seated on the seat.

According to an embodiment of the present invention, as the electric vehicle can be backed up at the creep vehicle speed lower than the normal speed when the rider walks, pushing the vehicle when vehicle speed is lower than the speed at which the rider walks, creep speed control can be made in the speed region in which the rider can operate by limiting speed.

According to an embodiment of the present invention, as the electric vehicle can be stopped when vehicle speed is higher than the speed at which the rider walks, pushing the vehicle, the electric vehicle can be prevented from being moved over the speed at which the rider can walk.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
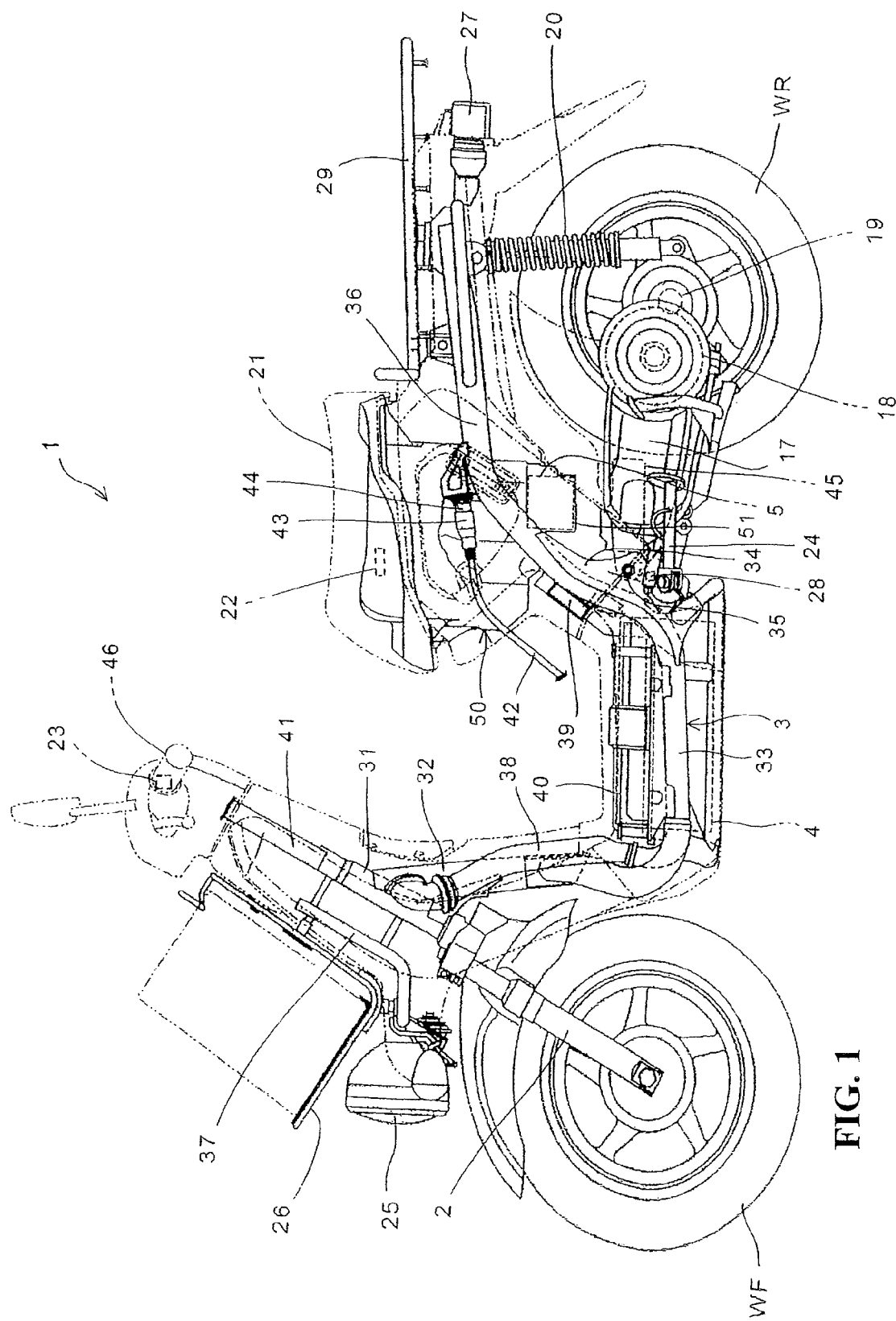
FIG. 1 is a left side view showing an electric vehicle suitable for applying a control device related to one embodiment of the present invention.

Referring to the drawings, one embodiment of the present invention will be described below. FIG. 1 is a left side view showing an electric vehicle provided with a control device in one embodiment of the present invention. The electric vehicle 1 is a scooter type motorcycle provided with a low deck floor and each component is attached to a body frame 3 directly or indirectly via another member. The body frame 3 is composed of a head pipe 31, a front frame part 32 an end of which is joined to the head pipe 31 and a rear end of which extends downwardly, a pair of main frame parts 33 branched laterally in a direction of vehicle width from the front frame part 32 and extending to the rear of a vehicle body and rear frame parts 36 extended upwardly and to the rear of the vehicle body from each main frame part 33.

A front fork 2 that supports a front wheel WF is steerably supported by the head pipe 31. A steering handlebar 46 provided with an accelerator grip is coupled to an upper part of a steering shaft 41 extended upward from the front fork 2 and supported by the head pipe 31. A throttle sensor 23 for detecting a turned angle of the accelerator grip, that is, a throttle opening TH is provided to the steering handlebar 46.

A bracket 37 made of a pipe is connected to the front of the head pipe 31, a headlight 25 is attached to a front end of the bracket 37, and a front carrier 26 supported by the bracket 37 is provided over the headlight 25.

A bracket 34 extending to the rear of the vehicle body is joined to an intermediate area of the main frame part 33 and the rear frame part 36 in the body frame 3. A pivot 35 extending in the direction of vehicle width is provided to the bracket 34 with a swing arm 17 vertically swingably supported by the pivot 35. A motor 18 as a vehicle driving source is provided to the swing arm 17, the output of the motor 18 is transmitted to a rear axle 19 with the output of the motor driving a rear wheel WR supported by the rear axle 19. A housing including the rear axle 19 and the rear frame part 36 are coupled by a rear suspension 20. In addition, a speed of revolution sensor as a vehicle speed sensor 30 is provided that detects the number of revolutions of the motor 18. The vehicle speed sensor 30 is connected to the swing arm 17.

A side stand 24 that supports the vehicle body during stopping is provided to the bracket 34 and is provided with a side stand switch 28 that outputs a detection signal when the side stand 24 is stored in a predetermined position.

A high-voltage (for example, rated at 72 V) main battery 4 composed of a plurality of battery cells is mounted on the main frame part 33 and an upper part of the main battery 4 is covered with a cover 40. An air intake pipe 38 is coupled to the front of the main battery 4 and an intake fan 39 is provided to the rear of the main battery 4. Air is introduced to the main battery 4 from the air intake pipe 38 by the intake fan 39 and the air is exhausted to the rear of the vehicle body after the air cools the main battery 4. It is desirable that air is introduced the air intake pipe 38 through an air cleaner not shown.

A socket 44 is attached to a plug 43 that extends from a cable 42 extending from a battery charger for charging the main battery 4. The socket 44 is provided on the rear frame part 36. A rear carrier 29 and a taillight 27 are further provided to the rear frame part 36.

A cargo room 50 is provided between the pair of right and left rear frame parts 36 and a low-voltage (for example, rated at 12 V) subbattery 5 charged by the main battery 4 is housed at a bottom 51 of the cargo room protruding downwardly from the cargo room 50. A power drive unit (PDU) 45 for controlling the motor 18 is provided to the swing arm 17.

A rider's seat 21 is provided that also functions as a lid of the cargo room 50. The rider's seat 21 is provided on the upside of the cargo room 50 and a seat switch 22 that is operated when a rider is seated and outputs a seating signal is provided to the rider's seat 21. In addition, for example, an inclination sensor for detecting a tilt angle in a lateral direction of the electric vehicle 1 can be provided at the bottom of the cargo room 50.

Figure 2:
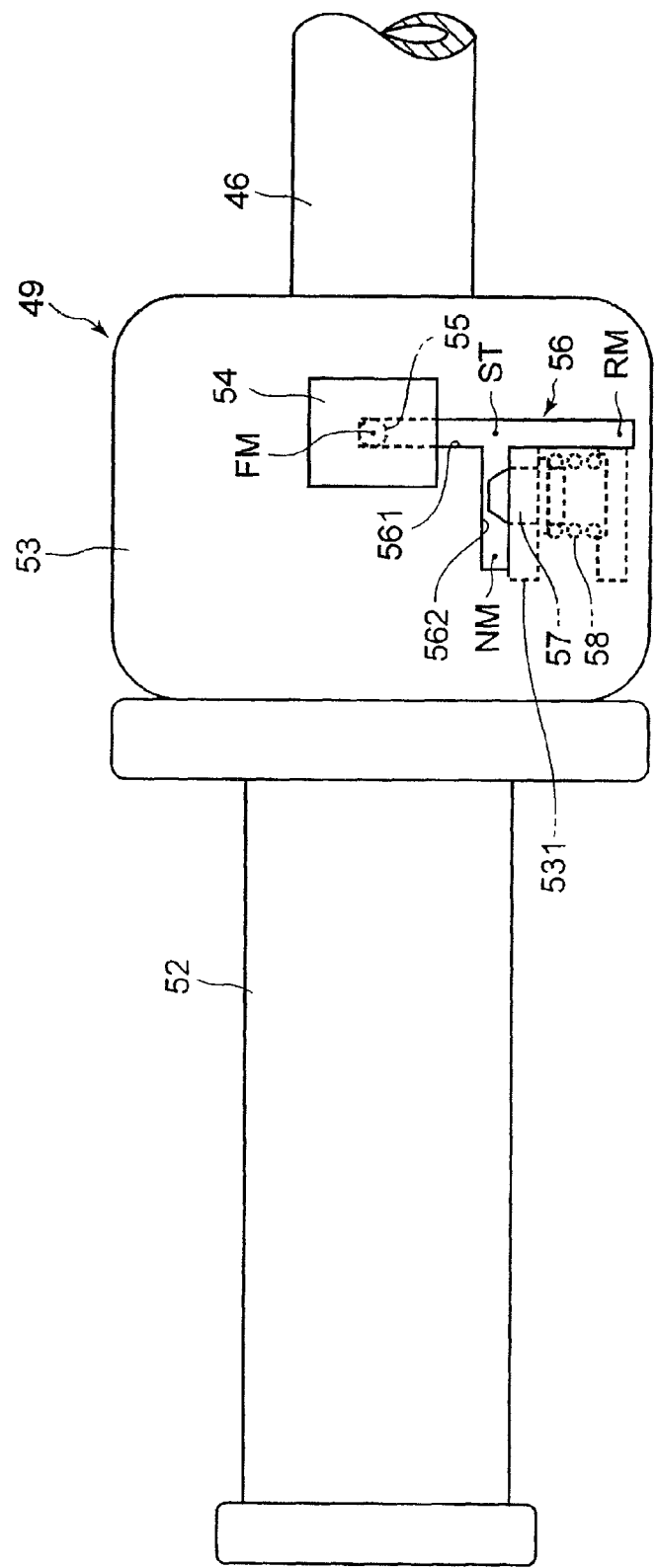
FIG. 2 is an outside drawing showing a left handlebar grip including a mode switch in the electric vehicle related to one embodiment of the present invention.

FIG. 2 shows the appearance of a mode switch. As shown in FIG. 2, the mode switch 49 is provided to select an operating mode of the electric vehicle 1. The operating mode includes a normal mode and a backing up mode. As the backing up mode, in addition to a creep speed backing up mode in which the electric vehicle 1 is backed up in a creep speed range of a lower speed than the speed in the normal mode, a creep speed advance mode can be provided in which the electric vehicle 1 can be advanced in the creep speed range. In the normal mode, the electric vehicle 1 is normally run forward at an optionally speed according to the operation of an accelerator. In the creep speed advance mode, the electric vehicle 1 is advanced in speed (hereinafter called creep speed) of 3 to 5 km per hour equivalent to the walking speed of a person. In the creep speed backing up mode, the electric vehicle 1 is run backward at a creep speed, that is, is backed up at creep speed.

The mode switch 49 is provided to a switch case 53 adjacent to the right side of a left grip 52 provided at a left end of the steering handlebar 46 of the electric vehicle 1. The reason why the mode switch 49 is provided on the left side of the steering handlebar 46 is to separate a mode switching operation as a separate operation from the operation of the accelerator by the accelerator grip normally provided on the right side of the steering handlebar 46. Accordingly, it is desirable that the mode switch 49 is made adjacent to the left grip 52, however, the mode switch may be also provided next to a right grip.

The mode switch 49 is provided with an operating section (a knob) 54 protruding outside the switch case 53 and a rod 55 extending inside the switch case 53 from the knob 54 and supported by the switch case 53. A guide groove 56 that guides the rod 55 to a position according to each mode is provided to the switch case 53.

The guide groove 56 is formed in a T type by a longitudinal groove 561 for enabling displacing of the rod between a position FM of the creep speed advance mode on the front side of the electric vehicle 1 and a position RM of the creep speed backing up mode on the rear side and a lateral groove 562 for enabling displacing the rod 55 from the center of the longitudinal groove 561 to the left side of the electric vehicle 1. A left end of the lateral groove 562 is equivalent to a position NM of the normal mode. An intersection of the longitudinal groove 561 and the lateral groove 562 is equivalent to a stop position ST and in a state in which the knob 54 is located in the stop position ST, the motor 18 is not driven even if the throttle opening TH is increased by the operation of the accelerator and the electric vehicle 1 is not operating.

A stopper 57 an end of which is overhanging on the side of the lateral groove 562 is provided so as to hold the rod 55 in the position NM of the normal mode. An end of the stopper 57 is tapered, the stopper is a cylindrical member as a whole, and is provided displaceably in a direction along the longitudinal groove 561. More specifically, the stopper 57 is held by a rib 531 protruding inside the switch case 53, its rear end is pushed by a spring 58, and the stopper is pushed out on the side of the lateral groove 562.

Figure 3:
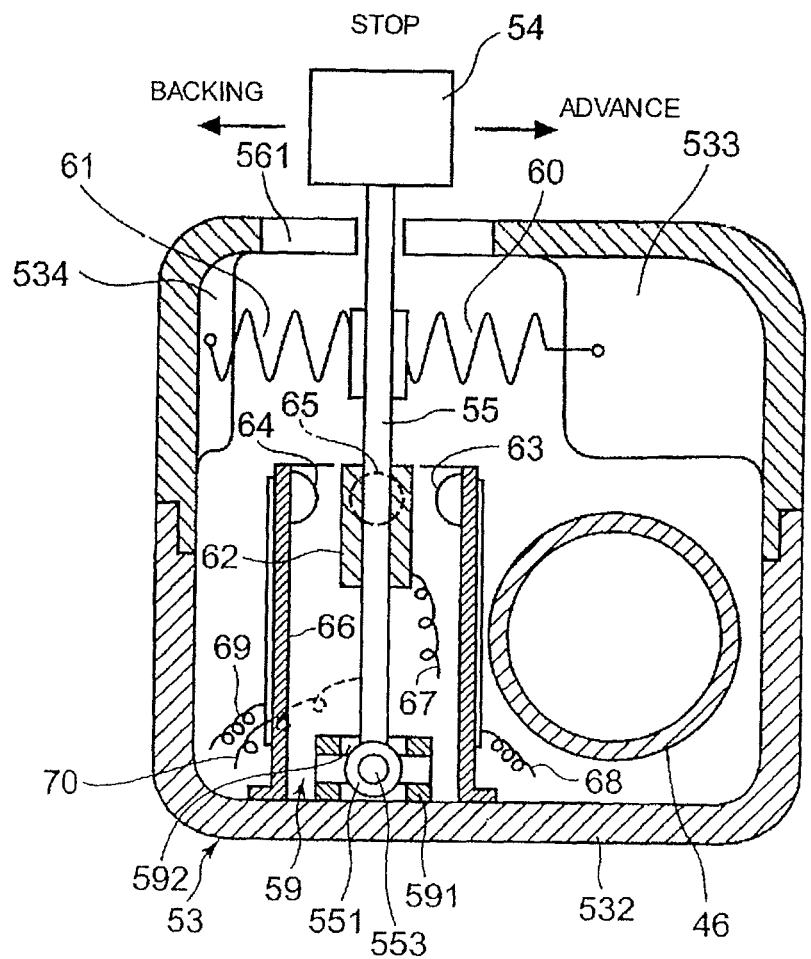
FIG. 3 is a sectional view showing the mode switch.
Figure 4A:
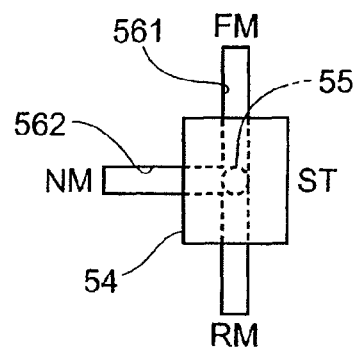
FIGS. 4(a) to 4(d) show a position in which the mode switch is switched corresponding to each mode.
Figure 4B:
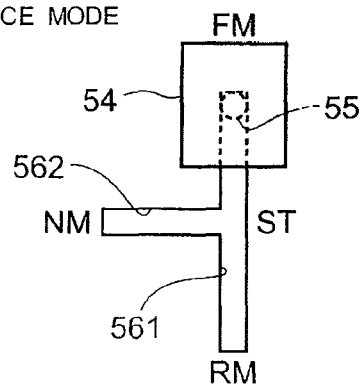
Figure 4C:
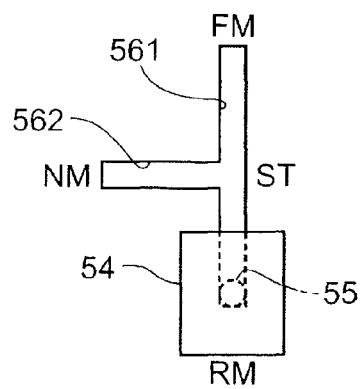
Figure 4D:
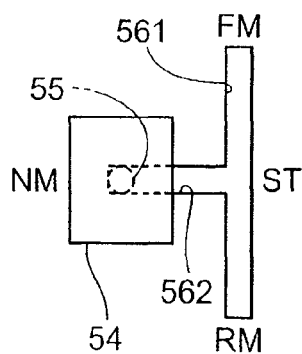

FIG. 3 is a sectional view showing the switch case 53 showing the structure of the mode switch 49. As shown in FIG. 3, a bearing 59 that supports one end of the rod 55 is provided onto a wall 532 of the switch case 53. The bearing 59 is a swivel composed of a first bearing 591 that rotatably supports a first supporting shaft extending in a longitudinal direction of the longitudinal groove 561 from a ring member 551 connected to the one end of the rod 55 and a second bearing 592 that rotatably supports a second supporting shaft 553 which pierces the ring member 551 and extends in a longitudinal direction of the lateral groove 562.

One ends of return springs 60, 61 extending in the longitudinal direction of the longitudinal groove 561 are connected on the side close to the knob 54 of the rod 55. The other ends of the return springs 60, 61 are respectively connected to ribs 533, 534 overhanged inside the wall of the switch case 53. As for the return springs 60, 61, a spring constant is set so that the rod 55 is held with the rod balanced in the stop position ST of the guide groove 56 in a free state.

A moving electrode 62 is provided on an outside periphery of the rod 55, a creep speed advance mode electrode 63, a creep speed backing up mode electrode 64 and a normal mode electrode 65 (shown by a dotted line) are further arranged in a circumference of the rod 55, and the electrodes are held by an insulating wall 66 positioned on the wall 532. The insulating wall 66 is cylindrical and the electrodes 63, 64, 65 are arranged on an inside face of the insulating wall 66. Conductors 67, 68, 69, 70 are connected to the electrodes 62, 63, 64, 65 and are connected to a control unit described later.

FIGS. 4(a) to 4(d) show correspondence between a position of the knob 54 in the mode switch 49 and the mode. In a stop mode shown in FIG. 4(a), the knob 54 and the rod 55 are located in the stop position ST in which the moving electrode 62 is touched to none of the creep speed advance mode electrode 63, the creep speed backing up mode electrode 64 and the normal mode electrode 65. In the creep speed advance mode shown in FIG. 4(b), the knob 54 and the rod 55 are located in the position FM of the creep speed advance mode in which the moving electrode 62 is touched to the advance mode electrode 63. In the backing up mode shown in FIG. 4(c), the knob 54 and the rod 55 are located in the position RM of the creep speed backing up mode in which the moving electrode 62 is touched to the creep speed backing up mode electrode 64. In the normal mode shown in FIG. 4(d), the knob 54 and the rod 55 are located in the position NM of the normal mode in which the moving electrode 62 is touched to the normal mode electrode 65.

In a state in which no external force is applied, that is, in a state in which the switch is not operated in the operation of the mode switch 49, the knob 54 is held in the stop position ST by the return springs 60, 61. As the rod 55 is touched to the end of the stopper 57 when the knob 54 is operated in a leftward direction of the electric vehicle 1 from this state, the rider feels a load. When the knob 54 is operated leftward further by force, a component of force that backs the stopper 57 acts on the tapered part at the end of the stopper 57, the stopper 57 compresses the spring 58 and makes the spring back, the rod 55 gets over the end of the stopper 57, and the rod is displaced to a left end of the lateral groove 562, that is, the position NM of the normal mode.

When the knob 54 is operated in a rightward direction from the position NM of the normal mode, the rod 55 gets over the end of the stopper 57 in the rightward direction from the leftward direction and can be returned to the stop position ST. When the knob 54 is pushed forward from the stop position ST, the rod 55 is displaced to the position FM of the creep speed advance mode and while the knob 54 is pushed forward, the advance mode is selected. When the rider detaches his/her hand from the knob 54, the rod 55 is returned to the stop position ST by the action of the return springs 60, 61, when the knob 54 is pulled backward (on the rear side of the electric vehicle 1) from there, the rod 55 is displaced to the position RM of the creep speed backing up mode, and while the knob 54 is pulled backward, the backing up mode is selected.

In the above-mentioned configuration, in normal operation, the mode switch 49 is operated and the normal mode is selected. As the mode switch 49 is held in the position NM of the normal mode as long as the mode switch is not operated, the rider operates the accelerator grip (provided to a right end of the steering handlebar 46) and can advance the electric vehicle 1. In creep speed operation, the rider operates the mode switch 49 and selects the creep speed advance mode or the creep speed backing up mode. In the creep speed advance mode and in the creep speed backing up mode, a speed range corresponding to the operation of the accelerator grip is switched to the creep speed range on the low-speed side, compared with the normal mode. Accordingly, when the accelerator grip is operated to the maximum, an instruction of output to limit vehicle speed to a maximum value (for example, 5 km per hour) of creep vehicle speed is supplied to the motor 18.

Figure 5:
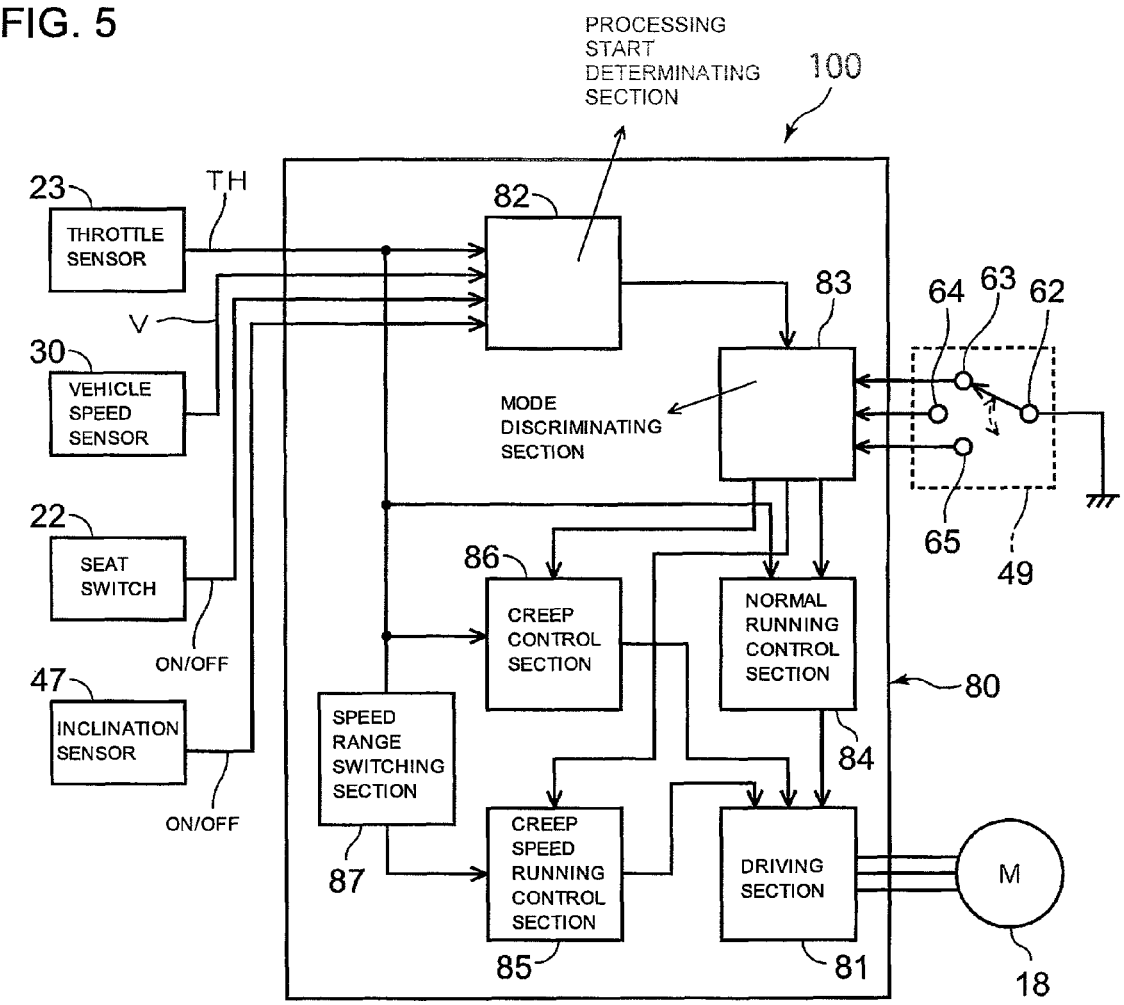
FIG. 5 is a block diagram showing a configuration of a control system of the electric vehicle.

FIG. 5 is a block diagram showing a control system for the motor 18. The control system 100 includes a control unit 80 to which each detection signal from the throttle sensor 23, the vehicle speed sensor 30, the seat switch 22, the inclination sensor 47 and the mode switch 49 is input and which is provided with a driving section 81 that drives the motor 18 so as to make the electric vehicle 1 advance and make the electric vehicle advance and back at creep speed respectively according to these detection signals.

The control unit 80 is composed of a microcomputer and is provided with the driving section 81, a processing start determining section 82, a mode discriminating section 83, a normal operating control section 84, a creep speed operating control section 85 and a creep control section 86. The processing start determining section 82 outputs a starting instruction to start control over operating when the output of the throttle sensor 23 shows that the throttle opening TH is zero, the output of the vehicle speed sensor 30 shows that vehicle speed V is zero and further, the seat switch 22 and the inclination sensor 47 output a signal showing an OFF state. The mode discriminating section 83 discriminates a position for the mode switch 49 to be switched in response to the starting instruction.

The normal operating control section 84, the creep speed operating control section 85 and the creep control section 86 are energized according to a mode discriminated by the mode discriminating section 83. The normal operating control section 84 inputs a normal speed instruction according to the throttle opening TH to the driving section 81 when the normal mode is discriminated by the mode discriminating section 83. The creep speed operating control section 85 inputs either of a creep advance speed instruction or a creep backing up speed instruction according to a throttle opening TH according to the mode to the driving section 81 when the creep speed advance mode or the creep speed backing up mode is discriminated by the mode discriminating section 83. The creep control section 86 inputs either of a creep advance speed instruction or a creep backing up speed instruction in which creep vehicle speed as a fixed value can be acquired according to the mode to the driving section 81 when it is discriminated by the mode discriminating section 83 that the mode is either of the creep speed advance mode or the creep speed backing up mode and the throttle opening TH is in a predetermined creep region DZ.

A speed range switching section 87 is provided on the input side of the creep speed operating control section 85, and the normal operating control section 84 and the creep speed operating control section 85 are set to output speed instructions in mutually different speed ranges for the same input values from the throttle sensor 23.

In addition, the speed range switching section 87 may be also provided with an optional function so that the normal operating control section 84 and the creep speed operating control section 85 output the same speed instructions for the same input values from the throttle sensor 23.

Figure 6:
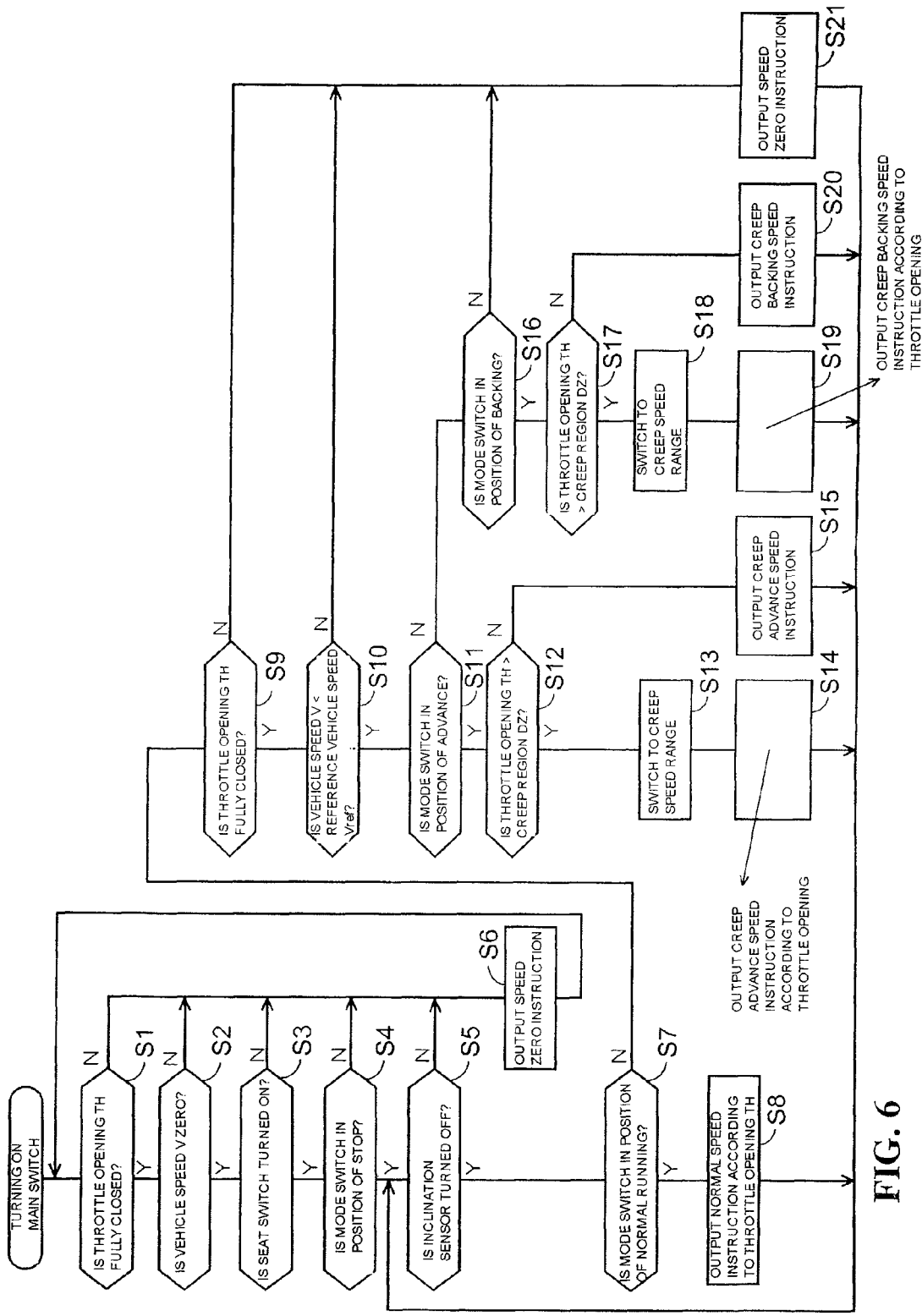
FIG. 6 is a flowchart showing operation of a control system.

FIG. 6 is a flowchart showing the operation of the control system. As shown in FIG. 6, in a step S1, it is determined based upon the output of the throttle sensor 23 whether a throttle opening TH is fully close or not. In a step S2, it is determined based upon the output of the vehicle speed sensor 30 whether vehicle speed V is zero or not. In a step S3, it is determined based upon the output of the switch 22 whether the rider is seated on the seat 21 or not. The seat switch 22 is set so that its output shows an ON state when the rider is seated. In a step S4, it is determined whether the mode switch 19 is in the stop position ST or not. In a step S5, it is determined based upon the output of the inclination sensor 47 that the electric vehicle 1 is not upset. The inclination sensor 47 is set so that its output shows an OFF state when the electric vehicle 1 is inclined by an upset determination reference angle or more.

When negative determination is made in at least one of the steps S1 to S5, a flow of processing proceeds to a step S6 and a revolution speed zero instruction to turn the revolution speed of the motor 18 zero is output. When affirmative determination is made in all the steps S1 to S5, the flow of processing proceeds to a step S7 and it is determined whether the mode switch 49 is located in the position NM of the normal mode or not.

When all the switch and sensors show zero or the OFF state and the switch and the sensors do not show the ON state or output except zero again by the processing in the steps S1 to S4, the motor 18 is controlled so that it is not started. Accordingly, when any of the switch or the sensors shows the ON state or output except zero, for example when a throttle is open, the rider proceeds to a process for starting the motor 18 after the rider intentionally performs operation for securely closing the accelerator grip to be fully closed. The reason is to enable starting the electric vehicle 1 with the rider's secure intention.

When the affirmative determination is made in all the steps S1 to S5, the flow of processing proceeds to the step S7. When affirmative determination that the mode switch 49 is located in the position NM of the normal mode is made in the step S7, the flow of processing proceeds to a step S8 and a normal speed instruction according to a throttle opening TH is output to the driving section 81 of the motor 18.

When the step S7 is negative, the flow of processing proceeds to a step S9 and it is determined based upon the output of the throttle sensor 23 whether a throttle opening TH is fully closed or not. When the step S9 is affirmative, the flow of processing proceeds to a step S10 and it is determined based upon the output of the vehicle speed sensor 30 whether vehicle speed V is equal to or lower than predetermined reference vehicle speed Vref or not. The processing in the step S10 can be added as a function of the mode discriminating section 83. The reference vehicle speed Vref is a maximum value of creep vehicle speed and is set to a value of an extent that the rider can walk, pushing the electric vehicle 1. The value is 6 km per hour for example.

When the step S10 is affirmative, the flow of processing proceeds to a step S11 and it is determined whether the mode switch 49 is located in the position FM of the creep speed advance mode or not. When the step S11 is affirmative, the flow of processing proceeds to a step S12 and it is determined whether a throttle opening TH is in the predetermined creep region DZ or larger or not. The creep region DZ is set to a minute region of the throttle opening TH, for example, a range of 1 to 3 degrees in an angle at which the accelerator grip is turned. When the throttle opening TH is in the creep region DZ or larger, the flow of processing proceeds to a step S13 and the speed range is switched to the creep speed range. In a step S14, a creep advance speed instruction according to the throttle opening TH is output to the driving section 81 of the motor 18. When the step S12 is negative, the flow of processing proceeds to a step S15 and a creep advance speed instruction is output to the driving section 81 of the motor 18. The creep advance speed instruction is equivalent to the output of the motor 18 in which the electric vehicle 1 can be advanced at predetermined creep speed (for example, 2 km per hour).

When the step S11 is negative, the flow of processing proceeds to a step S16 and it is determined whether the mode switch 49 is located in the position RM of the creep speed backing up mode or not. When the step S16 is affirmative, the flow of processing proceeds to a step S17 and it is determined whether a throttle opening TH is in the predetermined creep region DZ or larger or not. When the step S17 is affirmative, the flow of processing proceeds to a step S18 and the speed range is switched to the creep speed range. In a step S19, a creep backing up speed instruction according to the throttle opening TH is output to the driving section 81 of the motor 18. When the step S17 is negative, the flow of processing proceeds to a step S20 and a creep hacking up speed instruction is output to the driving section 81 of the motor 18. The creep backing up speed instruction is equivalent to the output of the motor 18 in which the electric vehicle 1 can be backed up at the predetermined creep speed (for example, 1 km per hour). When the step S16 is negative, the flow of processing proceeds to a step S21 and a revolution speed zero instruction to turn the revolution speed of the motor 18 zero is output.

The steps S1 to S3 and the step S5 are an optional process and all or a part may be also omitted. However, it is desirable that it is set as essential that a throttle opening TH is zero and vehicle speed V is zero by at least the steps S1 and S2.

Figure 7:
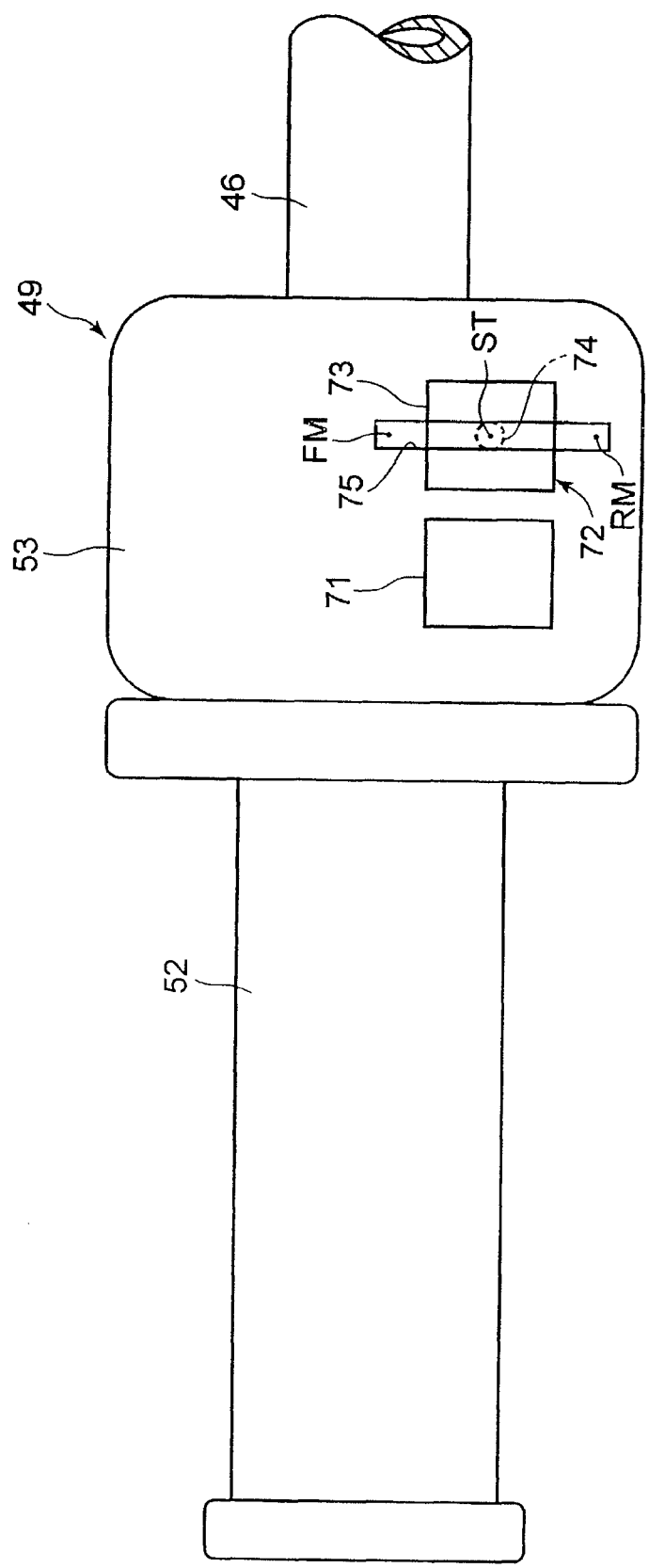
FIG. 7 is an outside drawing showing a left handlebar grip including a mode switch related to a second embodiment.

FIG. 7 is an outside drawing showing a mode switch in a second embodiment. In the second embodiment, the mode switch 49 is composed of two types of switch parts. A push switch 71 is arranged next to a left grip 52 in a switch case 53 and a slide switch 72 operable in a longitudinal direction of an electric vehicle 1 is arranged next to the push switch 71 and on the far side from the left grip 52. The push switch 71 is a switch of a type that it is fixed in a pushed position when operation for pushing it is performed, one electrode and the other electrode respectively configuring a contact in a pair are connected and the contact of both electrodes is released when operation for pushing the switch again from the state is performed to be a neutral position. For such a push switch, well-known one can be used.

The slide switch 72 is provided with a knob 73 protruding outside the switch case 53 and a rod 74 extending into the switch case 53 from the knob 73 and supported by the switch case 53. In the switch case 53, a guide groove 75 that guides the rod 74 to a position according to each mode is provided to the switch case 53.

The guide groove 75 is a long hole for enabling displacing the rod 74 between a position FM of a creep speed advance mode on the front side of the electric vehicle 1 and a position RM of a creep speed backing up mode on the rear side. An intermediate part of the guide groove 75 is equivalent to a stop position ST.

Figures 8, 9:
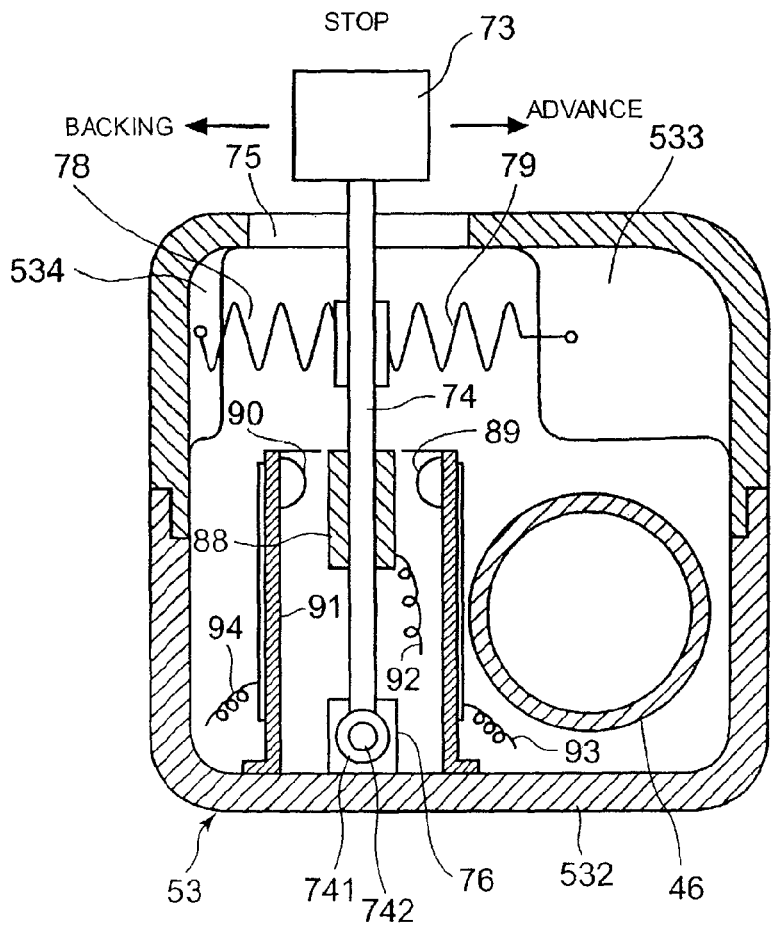
FIG. 8 is a sectional view showing the mode switch related to the second embodiment.
FIG. 9 shows a position in which the mode switch is switched corresponding to each mode in the second embodiment.

FIG. 8 is a sectional view of the switch case showing the structure of the slide switch 72. As shown in FIG. 8, a bearing 76 that supports one end of the rod 74 is mounted on a wall 532 of the switch case 53. The bearing 76 rotatably supports a supporting shaft 742 which pierces a ring member 741 connected to the one end of the rod 74 and extends in a direction perpendicular to a longitudinal direction of the guide groove 75.

Each one end of springs (return springs) 78, 79 extending in the longitudinal direction of the guide groove 75 is connected on the side close to the knob 73 of the rod 74. The other ends of the return springs 78, 79 are connected to the inside of the wall of the switch case 53. A spring constant is set to the return springs 78, 79 so that the rod 74 is held in the stop position ST of the guide groove 75 with the rod balanced in a free state.

A moving electrode 79 is provided to an outside periphery of the rod 74, further, a creep speed advance mode electrode 89 and a creep speed backing up mode electrode 90 are arranged in a circumference of the rod 74, and the electrodes are held by an insulating wall 91. Conductors 92, 93, 94 are connected to the electrodes 79, 89, 90 and these conductors 92 to 94 are extended to a control unit 80 of a control system.

The mode switch 49 composed of the push switch 71 and the slide switch 72 can be built in the control system 100 described in relation to FIG. 5 as in a mode switch provided with a single operating section. Detection signals of the push switch 71 and the slide switch 72 are input to the mode discriminating section 83 of the control unit 80 as information showing the normal mode, the creep speed advance mode and the creep speed backing up mode.

FIG. 9 shows correspondence between positions of the push switch 71 and the slide switch 72 and modes. In a stop mode shown in FIG. 9, the push switch 71 is not pushed down, the slide switch 72 is located in the stop position ST, and the moving electrode 79 of the slide switch 72 is not touched to the creep speed advance mode electrode 89 and the creep speed backing up mode electrode 90. In the advance mode shown in FIG. 9, the push switch 71 is not pushed down, the side switch 72 is located in the advance mode position FM, and the moving electrode 79 of the slide switch 71 is touched to the creep speed advance mode electrode 89. In the creep speed backing up mode shown in FIG. 9, the push switch 71 is not pushed down, the slide switch 72 is located in the creep speed backing up mode position RM, and the moving electrode 79 is touched to the creep speed backing up mode electrode 90. In the normal mode shown in FIG. 9, the push switch 71 is pushed down, in this state, the slide switch 72 fulfills no function, and the normal mode is selected independent of a position of the slide switch 72. The mode discriminating section 83 nullifies a detection signal of the slide switch 72 when a signal showing that push switch 71 is pushed down is input.

The present invention is not limited to the above-mentioned embodiments and further transformation is allowed in a scope described in the claims. For example, the electric vehicle 1 is not limited to a motorcycle and can be also applied to saddle-ride type three-wheeled and four-wheeled vehicles. In addition, the backing up mode can be also limited to only the creep speed backing up mode out of the creep speed advance mode and the creep speed backing up mode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control device for an electric vehicle provided with a motor that operates the vehicle according to a speed instruction according to a throttle opening by an accelerator operating means, comprising:
    an accelerator grip mounted on a first side of the electric vehicle and operatively connected to the throttle opening for normally controlling the speed of the electric vehicle;
    a mode switch mounted on a second side of the electric vehicle displaced relative to the accelerator grip, said mode switch being provided separately from the accelerator operating means for selecting either of a normal mode or a backing up mode of the vehicle, said mode switch being configured to be able to select a stop position corresponding to a position in which a single operating section is operated in addition to the normal mode and the backing up mode of the vehicle and said mode switch is provided with return springs configured to be able to be displaced among each switched position of the normal mode, the backing up mode and the stop position and which automatically returns the mode switch to the stop position set in an intermediate part of switched positions of the normal mode and the backing up mode in a free state in which no operating external force is applied;
    mode discriminating means for detecting that the backing up mode is selected by the mode switch when at least the throttle opening is zero and vehicle speed is zero; and
    a driving section for supplying a creep speed backing up instruction determined in a creep speed range when the backing up mode is selected by the mode discriminating means.

2. The control device for an electric vehicle according to claim 1, and further including stopper means made to recede to a stopper release position when the mode switch is energized by the operation of the operating section and arranged between the normal mode and the stop position to enable the operating section to be alternately displaced between the normal mode and the stop position.

3. The control device for an electric vehicle according to claim 1, wherein the first switch is a push switch provided with an initial position and a pushed position and configured to be returned to the initial position when the switch is pushed again in the pushed position, and the second switch is provided with return springs which are configured to be able to be displaced between the backing up mode and the stop position and which automatically returns the second switch to the stop position in a free state in which no operating external force is applied.

4. The control device for an electric vehicle according to claim 1, wherein the creep speed backing up instruction corresponds to fixed vehicle speed preset in the creep speed range.

5. The control device for an electric vehicle according to claim 1, wherein the creep speed backing up instruction corresponds to vehicle speed determined according to the throttle opening in the creep speed range.

6. The control device for an electric vehicle according to claim 1, wherein the throttle opening is provided with a creep region, and a creep control section supplying a creep speed instruction including a smaller value than a value in the creep speed range in the creep region to the driving section.

7. The control device for an electric vehicle according to claim 1, and further including:
    an inclination sensor for detecting a sideway inclination from a state in which the electric vehicle is vertically stood,
    wherein the mode discriminating means discriminates the mode when it is determined based upon the inclination that it is not detected that the electric vehicle is not upset.

8. The control device for an electric vehicle according to claim 1, comprising:
    a seat switch for outputting a detection signal when a rider is seated on a seat,
    wherein the mode discriminating means discriminates the mode when the rider is seated on the seat.

9. The control device for an electric vehicle according to claim 1, and further including:

a creep speed operating control section for supplying a creep speed backing up instruction to run the electric vehicle at creep vehicle speed lower than speed at which a rider walks pushing the vehicle to the driving section when vehicle speed is lower than the preset speed at which the rider can walk pushing the electric vehicle in the backing up mode.

10. The control device for an electric vehicle according to claim 1, wherein the creep speed operating control section supplies the speed instruction to stop the electric vehicle to the driving section when vehicle speed is higher than preset speed at which the rider walks, pushing the vehicle in the backing up mode.

11. The control device for an electric vehicle according to claim 1, wherein the backing up mode further includes a creep speed advance mode for advancing the vehicle in the creep speed range, and the mode switch is configured to be able to select an advance and the backing up of the vehicle included in the backing up mode.

12. The control device for an electric vehicle according to claim 11, wherein a stop position is set between a position in which an advance is selected and a position in which backing up is selected in the backing up mode of the mode switch.

13. The control device for an electric vehicle according to claim 1, wherein the electric vehicle is a saddle-ride type electric vehicle.

14. A control device for an electric vehicle provided with a motor, comprising:
an accelerator grip mounted on a first side of the electric vehicle and operatively connected to the throttle opening for normally controlling the speed of the electric vehicle;
a mode switch mounted on a second side of the electric vehicle displaced relative to the accelerator grip, said mode switch selecting either of a normal mode or a backing up mode of the vehicle;
mode discriminating means for detecting that the backing up mode is selected by the mode switch when at least a throttle opening is zero and vehicle speed is zero; and
a driving section for supplying a creep speed backing up instruction determined in a creep speed range when the backing up mode is selected by the mode discriminating means;
wherein the mode switch is composed of a first switch for switching validity and invalidity of the normal mode and a second switch which is turned valid when the first switch is turned invalid and in which either of the stop or the backing up mode can be selected.

15. The control device for an electric vehicle according to claim 14, wherein the mode switch is configured to be able to select a stop position corresponding to a position in which a single operating section is operated in addition to the normal mode and the backing up mode of the vehicle.

16. The control device for an electric vehicle according to claim 15, wherein the mode switch is provided with return springs configured to be able to be displaced among each switched position of the normal mode, the backing up mode and the stop position and which automatically returns the mode switch to the stop position set in an intermediate part of switched positions of the normal mode and the backing up mode in a free state in which no operating external force is applied.

17. The control device for an electric vehicle according to claim 16, and further including stopper means made to recede to a stopper release position when the mode switch is energized by the operation of the operating section and arranged between the normal mode and the stop position to enable the operating section to be alternately displaced between the normal mode and the stop position.

18. A control device for an electric vehicle provided with a motor that operates the vehicle according to a speed instruction according to a throttle opening by an accelerator operating means, comprising:
an accelerator grip mounted on a first side of the electric vehicle and operatively connected to the throttle opening for normally controlling the speed of the electric vehicle;
a mode switch mounted on a second side of the electric vehicle displaced relative to the accelerator grip, said mode switch being provided separately from the accelerator operating means for selecting either of a normal mode or a backing up mode of the vehicle;
mode discriminating means for detecting that the backing up mode is selected by the mode switch when at least the throttle opening is zero and vehicle speed is zero; and
a driving section for supplying a creep speed backing up instruction determined in a creep speed range when the backing up mode is selected by the mode discriminating means;
wherein the mode switch is composed of a first switch for switching validity and invalidity of the normal mode and a second switch which is turned valid when the first switch is turned invalid and in which either of the stop or the backing up mode can be selected.

* * * * *